United States Patent [19]

Glynn

[11] Patent Number: 5,557,637

[45] Date of Patent: Sep. 17, 1996

[54] CONVOLUTIONAL AMBIGUITY MULTIPLE ACCESS (CAMA) TRANSMISSION SYSTEM

[76] Inventor: Thomas W. Glynn, 1806 Severn Grove Rd., Annapolis, Md. 21401

[21] Appl. No.: 314,254

[22] Filed: Sep. 24, 1994

[51] Int. Cl.⁶ .............................. H03K 7/06; H03K 9/06; H04L 27/10; H04L 27/22
[52] U.S. Cl. .................. 375/271; 375/275; 375/279; 375/322; 375/329; 375/335; 375/346
[58] Field of Search ........................ 375/202, 205, 375/271, 272, 275, 279, 278, 284, 285, 322, 329, 334, 335, 340, 346; 370/69.1, 122, 77, 19, 23; 329/300, 304; 332/100, 103

[56] References Cited

U.S. PATENT DOCUMENTS

| | | | |
|---|---|---|---|
| 4,187,000 | 2/1980 | Constant | 350/162 SF |
| 5,029,184 | 7/1991 | Andren et al. | 375/1 |
| 5,065,242 | 11/1991 | Dieterich et al. | 358/167 |
| 5,191,594 | 3/1993 | Argo et al. | 375/1 |
| 5,260,968 | 11/1993 | Gardner et al. | 375/1 |
| 5,272,466 | 12/1993 | Venczel | 340/573 |

Primary Examiner—Stephen Chin
Assistant Examiner—Hai H. Phan
Attorney, Agent, or Firm—Venable, Baetjer, Howard & Civiletti LLP

[57] ABSTRACT

A communication system that reduces significantly the processing required to search over unknown time delays and unknown frequency shifts. Convolutional type processing with a unique re-indexing of the desired signal's Fourier transform is provided so as to allow for the design of a communication system that is invariant to time of arrival and frequency shift such as that caused by doppler effects from moving vehicles or moving satellites. The processing required is several orders of magnitude less computationally intensive than conventional approaches to solving this problem. In addition, the inventive convolutional ambiguity multiple access (CAMA) system can be used in conjunction with M-Ary FSK (Frequency Shift Keying) and other coding techniques to decode the various frequency codes efficiently. The technique also can be used as a processing system for radar, sonar, ultrasound, ladar, and other reflective transmission signals to generate a full ambiguity function, utilizing an arbitrary waveform efficiently. In addition, by processing each frequency independently, it is possible to remove frequency distortion (or time distortion that is frequency dependent) more accurately.

22 Claims, 5 Drawing Sheets

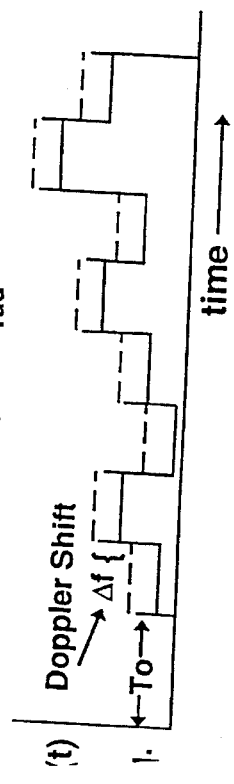

Transmitted Random Frequency Coded Waveform

Figure 4A

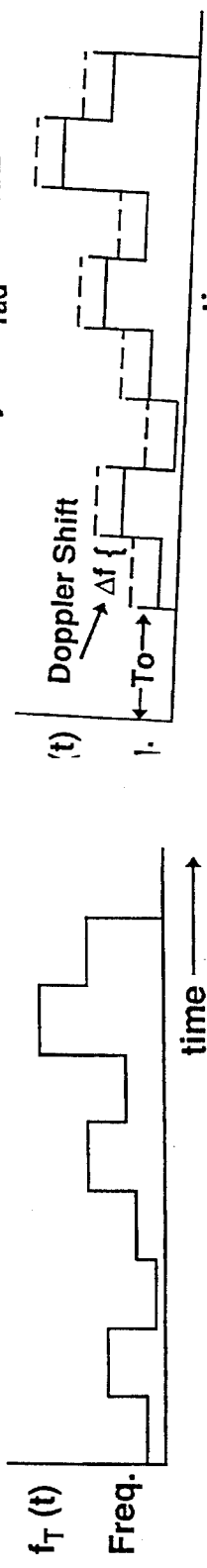

Return Waveform from target at Range $R = C/2\, \tau_0$ and with a Radial Velocity of $v_{rad} = \Delta f\, \lambda/2$

Figure 4B

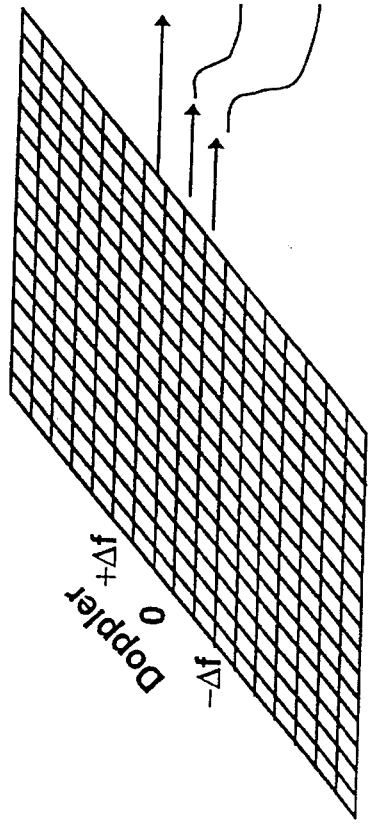

CAMA Implementation $F^{-1}[F_0(f_{in}(t))\, F(f_{ret}(t))] = $ 0th Doppler Return $F^{-1}[F_{n=n-1}(f_{in}(t))\, F(f_{ret}(t))] = $ 1st Doppler Return $F^{-1}[F_{n=n-2}(f_{in}(t))\, F(f_{ret}(t))] = $ 2nd Doppler Return The transformed replica can be predistorted to account for compression or expansion or any other frequency based distortion.

Full Radar/Sonar Range/Doppler Return for Arbitrary Waveform

Figure 4C

CAMA allows for appropriate compression to match doppler effect "perfectly" matching actual effect.

CAMA allows for specific frequency distortions (loss, phase shifts, non-linear effects) to be removed in the processing.

CONVOLUTIONAL AMBIGUITY MULTIPLE ACCESS (CAMA) TRANSMISSION SYSTEM

BACKGROUND OF THE INVENTION

1. Field of the Invention

The present invention relates to communication systems. More specifically, the present invention relates to a novel technique for efficient processing of a large number of trials in time and frequency to "find" a transmitted code or to decode a frequency coded signal. The invention is applicable to radar processing to generate a range/doppler map efficiently from an arbitrary coded signal.

2. Description of the Related Art

A number of multiple access signal transmission schemes have been defined, including TDMA (Time Division Multiple Access,) FDMA (Frequency Division Multiple Access,) and CDMA (Code Division Multiple Access). In general terms, TDMA involves very high speed packet modulation of a single waveform in a channel, where a channel is defined by a slice of time as measured by a defined offset from a synchronization (sync) pulse. TDMA transmission thus splits time for transmission into different segments, and sends different pieces of information in respective segments. Dividing a transmission according to time in this way requires very high speed analog-to-digital (A/D) converters, and very precise time control.

Rather than dividing transmission time into segments, FDMA splits a frequency band into channels which are sub-bands, and sends signals simultaneously across the various channels. As a result, transmitted signals tend to be relatively narrowband, and thus more susceptible to multipath distortion. Also, if the original transmission band is sufficiently large, it is possible that some of the sub-bands will traverse harmonics of other sub-bands at lower frequencies. This traversal can cause spurs which could wipe out specific channels. In addition, a linear operation is required to reduce the "mixing" of these channels. Such a relationship can force a decrease in available power in order to retain the requisite linearity.

CDMA uses simultaneous coded channels over a wide band. While this approach eliminates most of the problems associated with TDMA and FDMA, CDMA requires accurate time and frequency control to avoid time of arrival shift problems and doppler problems.

Given the various limitations of the foregoing approaches, it would be desirable to provide a transmission scheme which did not require the level of accuracy to prevent distortion, and which retains the advantages of wideband transmission.

SUMMARY OF THE INVENTION

In view of the foregoing, it is an object of the invention to provide a transmission scheme which transmits signals over a wide bandwidth.

It is another object of the invention to provide a transmission scheme which eliminates the problem of variable time of arrival and doppler shifting.

To achieve these and other objects, the present invention employs a convolutional approach to process signals for transmission over a wide range of time and frequencies. The inventive transmission scheme is called convolutional ambiguity multiple access transmission, or CAMA.

Previous computational capabilities made searching over time and frequency to process signals for efficient transmission a very computationally intensive process. However, the inventive approach employs an index shifted convolutional system which reduces the computational load by at least two orders of magnitude (i.e. 435:1 in example,) thus placing the computational requirements within reach of present-day hardware.

If a time domain waveform $f_{in}(t)$ were transmitted through a communication channel, the effect of the channel typically would be to delay in time by an amount of time $(T_0)$ and possibly to shift in frequency by an amount $(W_0)$ because of movement of either the sender or the receiver, or movement of the channel itself (i.e. satellite motion). As a result, the output will be delayed, and the frequency shifted in accordance with the following:

$$f_{out}(t) = f_{in}(t - \tau_0) e^{jW_0 t}$$

Conventional "replica" processing would multiply the received signal by the input signal, modified by various time delays and various frequency shifts, as shown above. If the multiplied function then is integrated over its uncertainty interval, the result will give a high response only when the time delay $\tau$ is equal to $\tau_0$ and the frequency shift $W$ is equal to $W_0$. For other values of $\tau$ and $W$, the function will oscillate, yielding an integral value very close to zero, as follows:

$$\int_{a+\tau_n}^{b+\tau_n} f(t - \tau_0) e^{jW_0 t} f(t - \tau_n) e^{jW_m t} dt = \int f^2(t) dt \quad \text{for} \quad \tau_n = \tau_0, W_m = W_0$$

$$\approx 0 \quad \text{for} \quad \tau_n \neq \tau_0, W_m \neq W_0$$

With this traditional process, $MK^2$ complex multiply-adds are required for K samples in the waveform and possible time delays and M possible doppler shifts. Thus, for a typical 10,000 sample (K) waveform with 20 doppler frequencies (M), $2 \times 10^9$ complex multiply adds would be required (typically, per bit).

In contrast, in accordance with the present invention, the first step would be to take the Fourier transform of the coded signal; this Fourier transform then could be stored. The resulting value would be multiplied by the Fourier transform of the received signal. The inverse Fourier transform of the product then would be taken, so as to yield, in a single computational step, the output of the above integral for all time delays (K) for the "0th" frequency. By reindexing the transform of the replica and repeating the above process, so that the index 1 becomes 0, the index 2 becomes 1, the index 3 becomes 2, etc., it is possible to obtain the result of the above integral for all time delays (K), for the first doppler frequency. The process then is repeated by re-indexing for each desired doppler frequency. This overall process would be represented as follows:

$$F^{-1}\{F_j[f_{in}(t)] F[f_{out}(t)]\} = \int f^2(t) \, dt \quad \text{for} \quad \tau_n = \tau_0$$
$$W_m = W_0$$
$$\approx 0 \quad \text{for} \quad \tau_n \neq \tau_0$$
$$W_m \neq W_0$$

where j is re-indexed for all M doppler frequencies.

In contrast to the $2 \times 10^9$ complex multiply-adds required for the conventional technique, the CAMA process takes $4K \log_2 K + M (K + 2K \log_2 K)$, or $4.6 \times 10^6$ complex multiply-adds (again, typically per bit). This computational requirement reduction may be explained as follows. If M and K are large, as typically they are, then the following relationship pertains:

$$4K \log_2 K + M(K + 2K \log_2 K) \approx 2M K \log_2.$$

Thus, the improvement ratio becomes $$\frac{MK^2}{2MK \log_2 K} : 1 = \frac{K}{2 \log_2 K} : 1$$

This improvement ratio is typical when a fast Fourier transform (FFT) is employed. Thus, by employing a convolutional implementation and reindexing, it is possible to utilize the computational advantages of an FFT in reindexing the required computations. Consequently, it can be seen that, in accordance with the present invention, the computational requirements thus are reduced by more than two orders of magnitude (by a factor of 435, to be precise).

As a result, in accordance with the present invention, a realistic system is provided that is invariant to time delays and frequency shifts.

The inventive system finds application in the area of M-Ary FSK (Frequency Shift Keying) coding. This coding technique allows for slight shifts in frequency (i.e. 32 frequencies) to contain separate channels which, for a specific code, can increase the number of channels significantly. However, in order to use this modulation technique, one must be able to decode the frequencies precisely. Utilizing CAMA allows easy decoding even when very complex FSK signals are involved.

There also is close parallel to this communications application in the radar/sonar field. If a "coded" signal were sent out, the return from an object would have a time delay that would be proportional to its distance from the radar, and it would have a doppler shift that would be proportional to the object's radial velocity. If the return were processed using CAMA, all time delays and all frequency shifts (what is typically called an ambiguity diagram) would be obtained very efficiently.

BRIEF DESCRIPTION OF THE DRAWINGS

The foregoing and other features and advantages of the present invention will become more apparent from the detailed description set forth below when taken in conjunction with the drawings, in which like reference characters are used throughout, and wherein:

FIG. 4 shows an application of the present invention to a typical radar processing implementation.

DETAILED DESCRIPTION OF THE PREFERRED EMBODIMENTS

Figure 1:
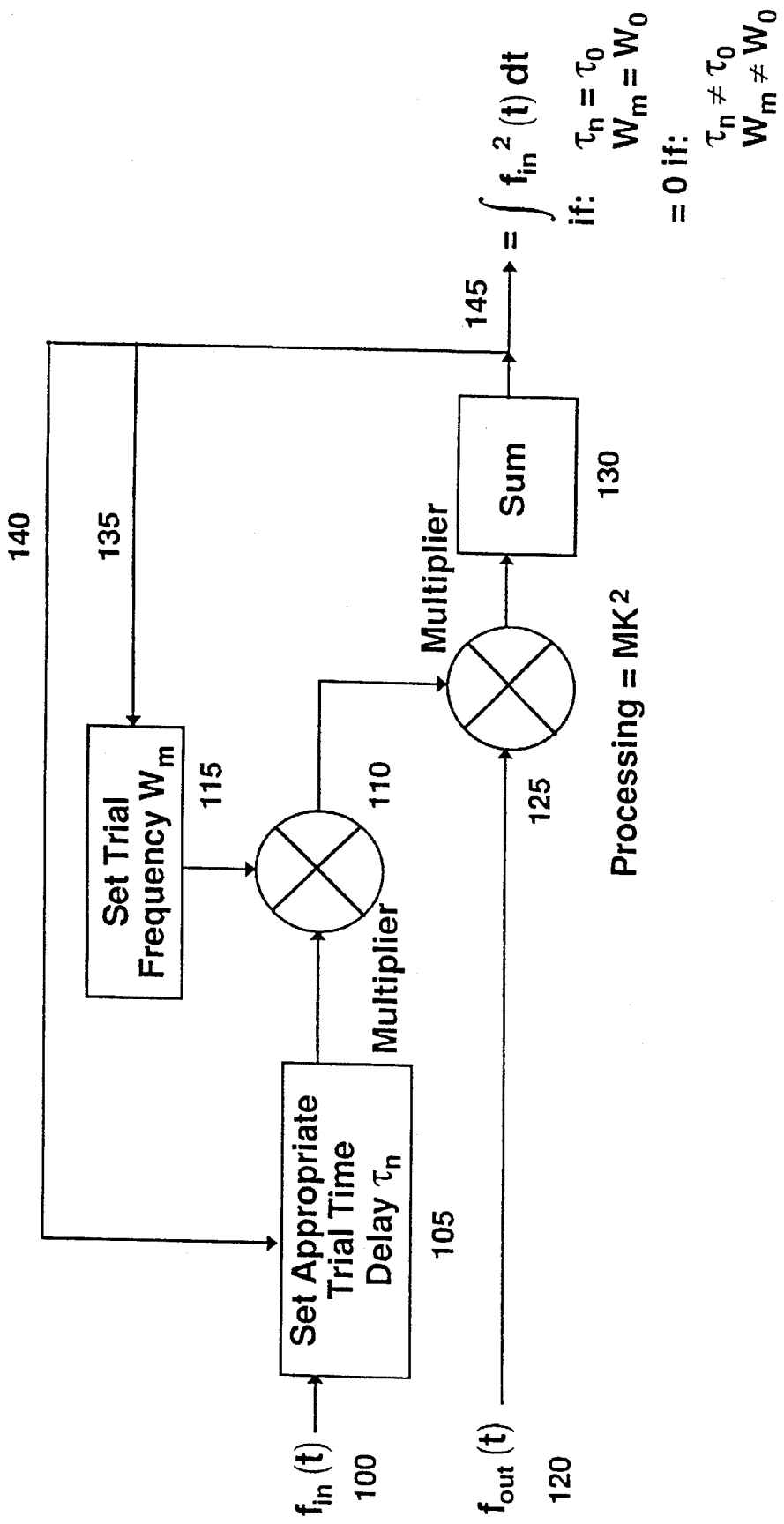
FIG. 1 is a block diagram showing a system used for conventional replica processing.

FIG. 1 describes a conventional approach known as "replica" processing. The "replica" is the complex conjugate of the actual signal sent by the transmitting device. Typically, it is called a replica because it replicates the transmitted signal, delayed in time and shifted in frequency. The complex conjugate is used to get unity when the correct replica is multiplied by its match. In accordance with this conventional technique, a stored replica of the signal sent (the code) $f_{in}(t)$ 100 is delayed by a trial time delay $\tau_n$ in block 105, that is based on the set of time delays being considered. The delayed signal which is output from block 105 then is mixed in multiplier 110 with a trial offset frequency $W_m$ from block 115, in accordance with the set of doppler shifts being considered. The output of multiplier 110 then is multiplied by the received signal $f_{out}(t)$ 120 in a second multiplier 125. As discussed earlier, $MK^2$ complex multiply-adds are required, where K is the number of samples and M is the number of possible doppler shifts.

The output of multiplier 125 then is integrated or summed in block 130 over the length of the code to yield an output 145 that is positive if both the time delay and the doppler shift match the actual communication channel time delay and frequency shift. If both do not match, the output will be sinusoidal and will have an average summed value close to zero. This process is repeated for all desired time delays, which are varied over line 140, and frequency (doppler) shifts, which are varied over line 135, until a match is made. This is a classic approach to "match filtering" of a distorted signal. This approach has not been used widely because the computational requirements are excessive, making the technique impracticable.

Figure 2:
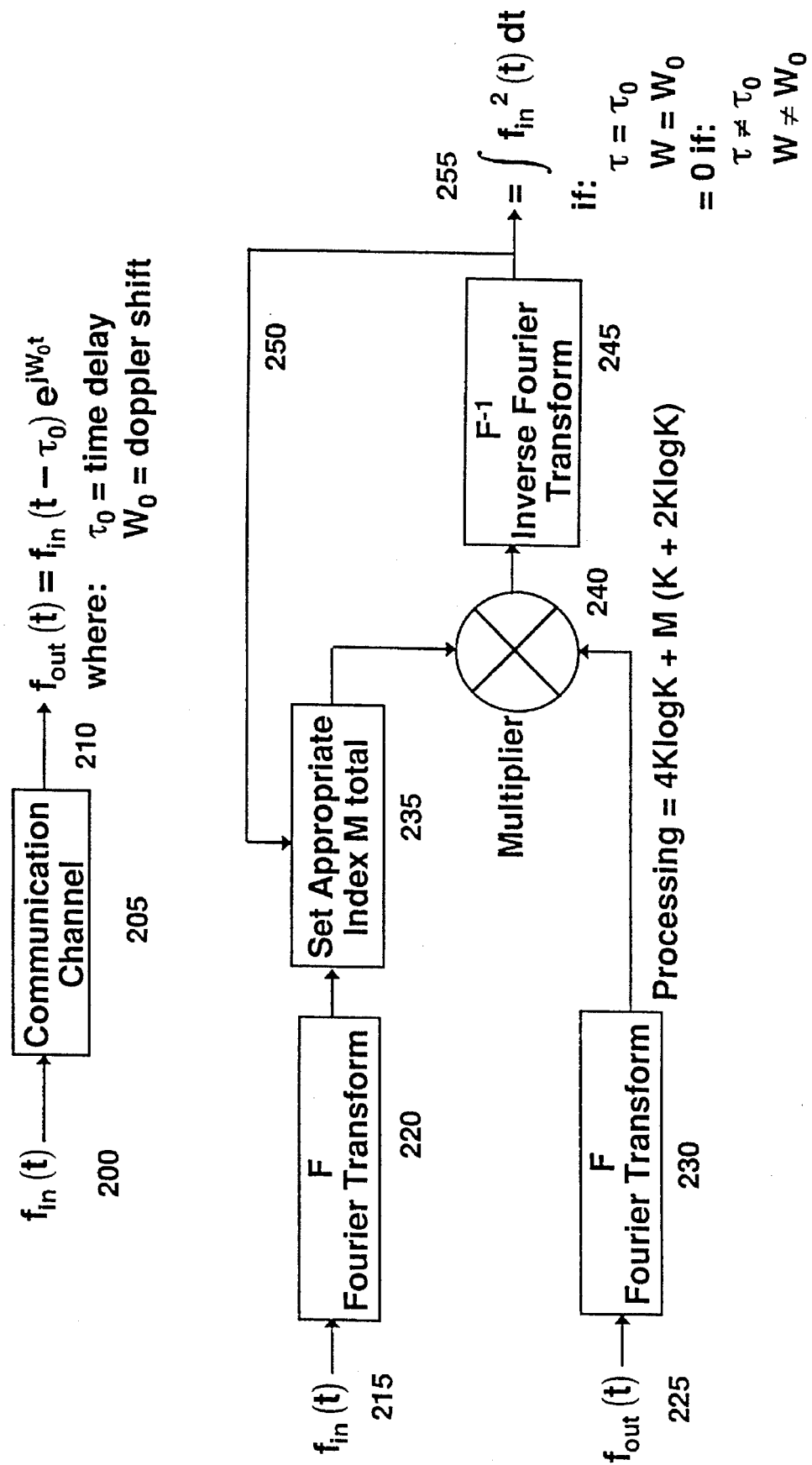
FIG. 2 is a block diagram of the invention, outlining the various computations involved.

In accordance with the present invention, a multiple access system that is invariant to time delays and frequency shifts is shown in FIG. 2. In FIG. 2, an arbitrary communication signal $f_{in}(t)$ 200 is sent through a communication channel 205 and is changed into an output signal $f_{out}(t)$ 210 which can be delayed in time and shifted in frequency. The time delays arise because of propagation delay, and therefore can be constant, or changing, or (in the case of multipath distortion) can even "jump". The frequency shift can arise because of the motion of the sender, the motion of the receiver, or the motion of any moving object (i.e. a satellite) being used for transmission. In addition, drifting local oscillators in the sender, the receiver or in any element in the communication path also can cause frequency drift. These distortions can cause great difficulty with most communication systems, thus requiring tightly controlled "pilot" signals and multiple loop time and frequency controls.

This present invention solves these problems as follows. First, a stored "replica" of what was sent (the code) 215 is Fourier transformed in block 220. The Fourier transform can be done ahead of time, or only once per use of the code. The received signal $f_{out}(t)$ 225 also is Fourier transformed, in block 230, and is multiplied by the Fourier transformed output of block 220 in multiplier 240, based on the index M that is set. The resultant product is inverse Fourier transformed in block 245 to yield a decoded signal 255 at the appropriate time delay, with no return at any other time delay for the zero doppler case. The stored Fourier transformed input is then re-indexed at block 235 such that spectral line #1 is re-indexed to #0, #2 is re-indexed to #1, etc. The multiplication in block 240 and inverse Fourier transform in block 245 then are performed again, yielding the decoded signal for the doppler shift. This re-indexing is performed for all desired doppler shifts, so as to decode the signal fully for all desired time delays and doppler shifts.

The just-described decoding process can handle not only a steady state time delay and doppler shift, but also multiple time delays that can occur with multipath. Each time delay will appear as a "spike" in the time delay doppler output. The "spikes" or various multipath signals also can have different doppler shifts.

Using the inventive process, as shown in FIG. 2, requires far fewer complex multiply-adds than previously was the case—a computational reduction by a factor of 435.

Figure 3:
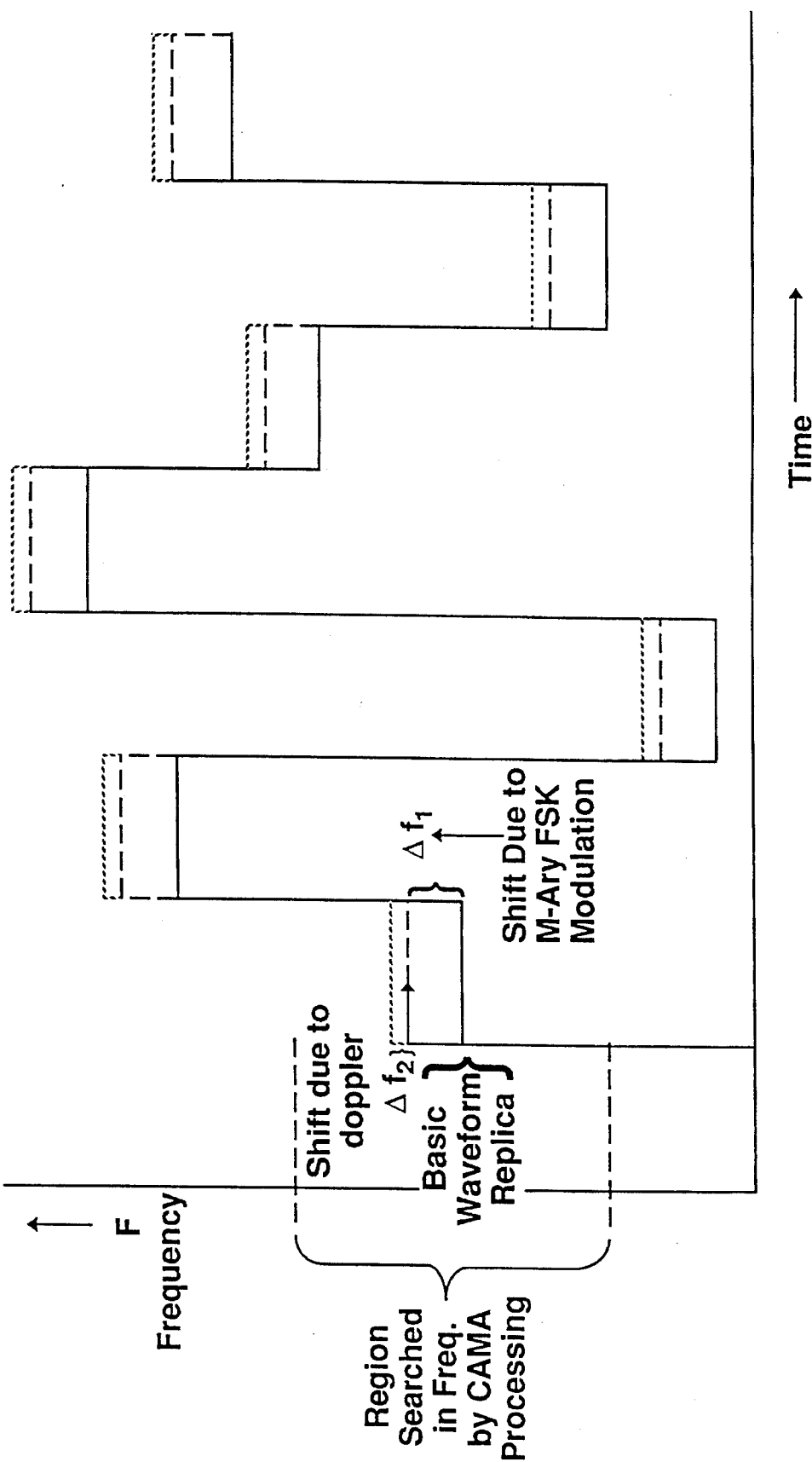
FIG. 3 describes the use of the invention to implement M-Ary FSK coding.

FIG. 3 describes an additional advantage of the invention. The most likely implementation of the invention that is contemplated at present would employ frequency hopping. As a result, it would be necessary to search over a wide range of doppler frequencies. Because of the wide search range that already would be involved, the addition of M-ary FSK modulation would entail virtually no additional processing load. That is, because the signal already is being spread over a wide frequency band (typically one or two MHz,) the addition of a few kHz to perform M-ary FSK would be negligible. In contrast, in an FDMA approach using 2.0 kHz channels, the M-ary addition would cut the available capacity approximately in half. In the implementation, the basic frequency stepped code would be shifted slightly up and down to create FSK modulation. This approach yields a significant increase in capability while causing only a slight increase in the processing load.

FIG. 3 shows the variation of the frequency of the coded waveform with time, and also shows the region of the waveform that would be searched using CAMA processing, as well as the basic waveform replica, and the shifts arising from doppler effects, and those arising from M-ary FSK modulation. Typically, M-ary FSK modulation is not used at present, because it requires a wide bandwidth channel. However, since the inventive technique is intended to operate over a very wide bandwidth anyway (e.g. a spread spectrum technique,) the addition of only a few percent bandwidth will allow the use of M-ary FSK, thus gaining the advantages of that technique in operating at low signal-to-noise ratios, and thus gaining more capacity.

FIG. 4 describes the applicability of the present invention in the area of remote active sensing, and in particular to radar, sonar, ultrasound, ladar or any active "bounce" type sensing system. When a coded waveform $f_r(t)$ is transmitted, the signal will then "bounce" off of objects and background in its transmission path, and a reflected signal can be intercepted. If processed correctly over a range of time delays and frequency shifts, a range/doppler map of what the sensor is irradiating can be obtained. Classical processing would be as described above with respect to FIG. 1, wherein the "replica" or the signal being sent out would be delayed and frequency shifted, and then multiplied by the return signal to determine the "echo" strength at a particular range and for a particular doppler shift. A moving target will cause the frequency of the return to shift from the original frequency. This is called a "doppler" shift, as shown in the portion of FIG. 4 depicting the return waveform. In that portion of the Figure, a range $R=C/2 \times \tau_0$, and a radial velocity $V_{rad}=\Delta f \times \lambda/2$ are assumed, where C is the speed of sound, and $\lambda$ is the wavelength.

However, as shown in FIG. 2, CAMA processing can be applied so as to obtain the full range doppler map with significantly fewer computations, based on the use of Fourier and inverse Fourier transforms that are re-indexed as necessary. Referring to FIG. 4, then, the various doppler returns are shown. In the case of obtaining a return from a target, $f_{ret}(t)$ is used as an input instead of $f_{out}(t)$. With this substitution in FIG. 2, the CAMA implementation can be understood readily.

In the above description, a frequency stepped waveform has been utilized for illustrative purposes. However, the same processing scheme could be applied to any wideband signal scheme, including FSK, PSK (phase shift keying,) noise like coded signals, etc. In addition, in the foregoing implementation, the Fourier transform of the "replica" was used. However, doppler effects are not actually frequency shifts; more correctly, they represent a time compression (or expansion). Thus, it is the total length of the signal that changes because of a doppler shift. Because the replica is stored and one doppler bin is processed at a time, it is possible to redefine the replica as a shortened replica for more accurate processing using CAMA processing, because frequency specific distortions (such as doppler compression or expansion, transmission path frequency variability, and the like) can be included in the processing.

Figure 5A:
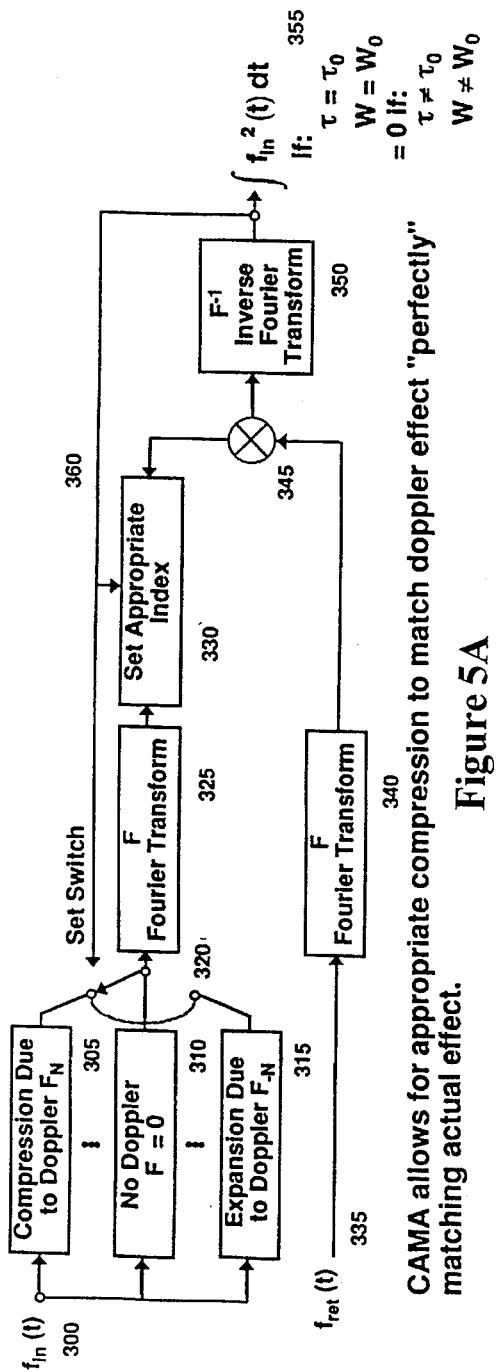
FIGS. 5A and 5B show other alternative implementations of the invention.
Figure 5B:
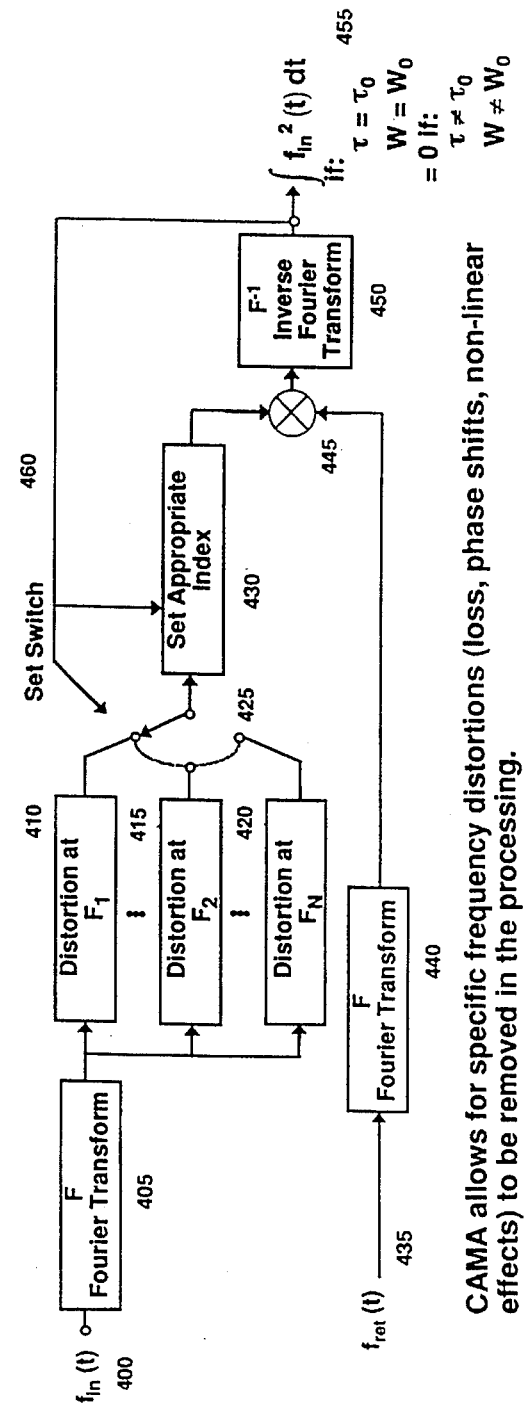

FIGS. 5A and 5B show alternative embodiments of the invention to handle doppler and other types of distortion. In FIG. 5A, an input signal $f_{in}(t)$ 300 is processed in three ways. The signal is time compressed in block 305 to create a replica for frequency $F_N$, which is the highest searched frequency. Second, in parallel, the input signal also is time compressed (in block 310) similarly for all frequencies from $F_N$ to $F_0$ (zero frequency). Finally, again in parallel, time expansion is performed in block 315 for all negative doppler frequencies, up to $F_{-N}$. The selected signal then is processed using CAMA processing, using the technique shown in FIG. 2. More specifically, a Fourier transform of the output is performed in block 325, and an appropriate index set in block 330. The output of block 330 is provided to multiplier 345.

One difference between FIG. 5A and FIG. 2, in addition to the handling of $f_{in}(t)$, is that $f_{ret}(t)$ 335, rather than $f_{out}(t)$ as in FIG. 2, corresponding to the signal return, is input, and is Fourier transformed in block 340. The output of block 340 also is passed to block 345, and the output of block 345 is inverse Fourier transformed in block 350. The output of block 350 is used to take care of reindexing in block 330, and to set switch 320, in accordance with an appropriately selected and compressed $f_{in}(t)$ is input to the system. Also, it should be noted that, through block 325, the Fourier transform of the expanded signal can be performed once, ahead of time, and the compressed/expanded/transformed signals can be stored for use when the appropriate frequency is being calculated. In this manner, the signal is decoded fully for all desired time delays and doppler shifts, as in the embodiment of FIG. 2.

In FIG. 5B, dealing with the case of frequency distortions, rather than compressions due to doppler shifting, where the distortion is at a particular frequency that is characterizable in the frequency domain, the input signal $f_{in}(t)$ 400 is transformed first, in block 405. Then, the result is distorted appropriately at each processed frequency $F_1$ (block 410), $F_2$ (block 415), ..., $F_N$ (block 420), the appropriate frequency then being selected by switch 425. The remaining processing is similar to that in FIG. 5A, and for that matter, in FIG. 2. As in FIG. 5A, the transform and distortion can be performed ahead of time and stored.

Various modifications to these embodiments will be readily apparent to those of working skill in this technical field. Thus, the present invention is not intended to be limited to the embodiments herein, but is to be accorded the widest scope consistent with the principles as novel features disclosed herein.

What is claimed is:

1. A multiple access processing system for processing an input signal for transmission as an output signal, said system comprising:

first means for taking a Fourier transform of a known original signal corresponding to the input signal, using at least one predetermined index, and providing a first result;

second means for taking the Fourier transform of the output signal and providing a second result;

third means for multiplying the first and second results together to provide a product;

fourth means for taking the inverse Fourier transform of the product and providing a further result; and fifth means for reindexing the Fourier transform computed by the first means by shifting the at least one predetermined index to provide a reindexed first result;

wherein said third means multiplies the reindexed first result and the second result, said fifth means providing reindexing a predetermined number of times and said third means operating on each reindexed first result and the second result, so as to generate a decoded input signal at an appropriate time delay and doppler shift.

2. The multiple access processing system of claim 1, wherein said input signal is a radar signal, wherein said appropriate time delay corresponds to range of the radar signal and said doppler shift corresponds to a frequency shift translated to target doppler.

3. The multiple access processing system of claim 1, wherein said input signal is a sonar signal, wherein said appropriate time delay corresponds to range of the sonar signal and said doppler shift corresponds to a frequency shift translated to target doppler.

4. The multiple access processing system of claim 1, wherein said input signal is an ultrasound signal, wherein said appropriate time delay corresponds to range of the ultrasound signal and said doppler shift corresponds to a frequency shift translated to target doppler.

5. The multiple access processing system of claim 1, wherein said input signal is a ladar signal, wherein said appropriate time delay corresponds to range of the ladar signal and said doppler shift corresponds to a frequency shift translated to target doppler.

6. The multiple access processing system of claim 1, wherein said input signal is an M-ary FSK modulated signal.

7. The multiple access processing system of claim 1, wherein said input signal is a PSK modulated signal.

8. The multiple access processing system of claim 1, wherein said known original signal is a replica of the input signal.

9. The multiple access processing system of claim 8, further comprising means for storing said replica and means for refining said replica to provide a more accurate replica, said more accurate replica being applied to said first means to obtain said first result.

10. The multiple access processing system of claim 9, wherein said means for refining said replica comprises means for processing one doppler bin at a time, so as to allow inclusion of frequency specific distortions in processing.

11. The multiple access processing system of claim 10, wherein said frequency specific distortions are selected from the group consisting of doppler compression, doppler expansion, and transmission path frequency variability.

12. A multiple access processing and transmission method for processing an input signal and transmitting an output signal accordingly, said method comprising the following steps:

a) taking a Fourier transform of a known original signal corresponding to the input signal, using at least one predetermined index, and providing a first result;

b) taking a Fourier transform of the output signal and providing a second result;

c) multiplying the first and second results together to provide a product;

d) taking an inverse Fourier transform of the product and providing a further result;

e) reindexing the Fourier transform computed in said step a) by shifting the at least one predetermined index to provide a reindexed first result;

f) multiplying the reindexed first result and the second result;

g) performing said reindexing step a predetermined number of times and operating on each reindexed first result and the second result accordingly;

h) generating a decoded input signal at an appropriate time delay and doppler shift in accordance with said steps a)–g); and i) generating and transmitting said output signal in accordance with said step h).

13. The multiple access processing method of claim 12, wherein said input signal is a radar signal, wherein said appropriate time delay corresponds to range of the radar signal and said doppler shift corresponds to a frequency shift translated to target doppler.

14. The multiple access processing method of claim 12, wherein said input signal is a sonar signal, wherein said appropriate time delay corresponds to range of the sonar signal and said doppler shift corresponds to a frequency shift translated to target doppler.

15. The multiple access processing method of claim 12, wherein said input signal is an ultrasound signal, wherein said appropriate time delay corresponds to range of the ultrasound signal and said doppler shift corresponds to a frequency shift translated to target doppler.

16. The multiple access processing method of claim 12, wherein said input signal is a ladar signal, wherein said appropriate time delay corresponds to range of the ladar signal and said doppler shift corresponds to a frequency shift translated to target doppler.

17. The multiple access processing method of claim 12, wherein said input signal is an M-ary FSK modulated signal.

18. The multiple access processing method of claim 12, wherein said input signal is a PSK modulated signal.

19. The multiple access processing method of claim 12, wherein said known original signal is a replica of the input signal.

20. The multiple access processing method of claim 19, further comprising the steps of storing said replica and refining said replica to provide a more accurate replica, said more accurate replica being applied to obtain said first result.

21. The multiple access processing method of claim 20, wherein said step of refining said replica comprises processing one doppler bin at a time, so as to allow inclusion of frequency specific distortions in processing.

22. The multiple access processing method of claim 21, wherein said frequency specific distortions are selected from the group consisting of doppler compression, doppler expansion, and transmission path frequency variability.

* * * * *